Patented June 21, 1927.

1,633,078

UNITED STATES PATENT OFFICE.

ANDREW ENGLE, OF NEWTON, IOWA, ASSIGNOR OF ONE-HALF TO JAMES MAINE, OF DES MOINES, IOWA.

PROCESS OF DISPOSING OF WASTE MATERIAL AND UTILIZING COMPONENTS THEREOF.

No Drawing.  Application filed August 24, 1925. Serial No. 52,193.

The primary object of this invention is to provide an improved method and process of disposing of waste materials such as sewage, night soil and garbage, in such manner that parts thereof may be utilized for purposes such as fertilizing compositions and fuel.

A further object of the invention is to provide an improved and sanitary, and at the same time an economical, method and process of disposing of sewage, night soil, garbage and the like by depositing in a closed tank and retaining therein while friendly bacteria act for the production of nitrates which make the product suitable as a fertilizer, the method also contemplating the separation of liquid from the solid portions that they may be separately used.

A further object is to provide improved means for treating the waste materials in such a way that the bacteria may act for the production of nitrates, all fermentation and odor is prevented, the liquids are caused to separate from the solid portions, and the liquids are also subjected to filtering operations.

A further object is to so treat the materials that the bacteria may act for production of nitrates, the liquids be caused to separate from the solid portions, and at any time desired the materials be subjected to the action of antiseptic substances for the purpose of killing noxious and virulent germs or microbes which may be present.

With these and other objects in view, my invention consists in the process hereinafter set forth and pointed out in the claims.

My improved process consists first in depositing the waste materials such as sewage, night soil, garbage and the like in a closed tank which is effectually sealed against the escape of gases, vapors and odors and against the entrance of atmospheric air. The means employed may be such as are illustrated and described in my companion application filed August 24, 1925, Serial Number 52,195. This tank preferably is divided by a transverse partition of soft brick or other substantially porous substance and the waste materials are deposited in the initial compartment, some of the liquid portions passing through the partition to the other compartment, while the solids are retained in the initial compartment. The compartments may be provided each with a manhole having a liquid-sealed cover. Materials may be introduced to the initial compartment by a pipe having a trap to prevent the escape of gases. In the several compartments the materials are permitted to remain for a considerable time during which friendly bacteria act for the production of nitrates, which in time render the materials, both solid and liquid, valuable for fertilizing composition, and they may in fact be removed from time to time and used in their then condition for that purpose; or they may be further treated. When deemed necessary, disinfectant and antiseptic substances may be introduced to the compartments to kill any dangerous germs of diseases, or microbes, or hook worms which may be present in the materials introduced.

If desired the liquid portions may be drawn off and filtered in any suitable manner. I prefer to pass them into an open filtering tank containing a suitable filtering material upon which is superposed a substantially porous false bottom of soft brick or the like, which retains the solid portions or any sediment remaining; the liquid portions passing through the false bottom to the filtering material by which they are filtered and clarified and rendered further fit for use as a fertilizing agent. I prefer to discharge the liquids from the last compartment of the closed tank to the filtering device by means of a valve-controlled siphon pipe; and from the bottom of the filtering device they may be drawn off by a conduit or pipe for use.

It is also desirable to employ liquids from the second compartment of the closed tank for flushing the inlet pipe and its trap, in order not to dilute the materials too much by the use of water for flushing, and this may be accomplished by means of a pump connected with the liquid compartment and discharging into the inlet pipe above the trap.

This process of disposing of sewage, night soil and garbage will be advantageous for school buildings, hotels, public or private buildings of any character, camps and the like, and provides a sanitary and economical method of getting rid of these materials and rendering them fit to be utilized for useful and valuable purposes. It also removes breeding and harboring places for flies and mosquitoes, and adds to sanitary conditions by preventing the spreading of germs through these agencies.

I claim as my invention—

1. A process for disposing of sewage, night soil, garbage and the like, which consists in introducing such materials into a closed and sealed tank having a substantially porous partition through which the liquid portions may pass, permitting the solid and liquid portions to remain in said tank for a considerable time while nitrate-producing bacteria act thereon and therein, and utilizing some of the liquid portions from time to time for flushing the entrance of new material to the tank.

2. A process for disposing of sewage, night soil, garbage and the like, which consists in introducing such materials into a closed and sealed tank having a porous partition through which the liquid portions only may pass, permitting the solid and liquid portions to remain in said tank for a considerable time while nitrate-producing bacteria act thereon and therein, and introducing a germicidal substance into said tank for the purpose of killing dangerous germs and the like.

Signed at Des Moines, in the county of Polk and State of Iowa, this 15th day of August, 1925.

ANDREW ENGLE.